(12) United States Patent
Lienkamp et al.

(10) Patent No.: US 10,340,487 B2
(45) Date of Patent: Jul. 2, 2019

(54) CONTACTING APPARATUS FOR CONTACTING AN ENERGY STORAGE CELL

(71) Applicant: Technische Universitat Munchen, Munich (DE)

(72) Inventors: Markus Lienkamp, Garching (DE); Martin Rudolf Hammer, Munich (DE)

(73) Assignee: Technische Universität München, Munich (DE)

( * ) Notice: Subject to any disclaimer, the term of this patent is extended or adjusted under 35 U.S.C. 154(b) by 48 days.

(21) Appl. No.: 15/320,790

(22) PCT Filed: Jun. 22, 2015

(86) PCT No.: PCT/EP2015/063956
§ 371 (c)(1),
(2) Date: Dec. 21, 2016

(87) PCT Pub. No.: WO2015/197545
PCT Pub. Date: Dec. 30, 2015

(65) Prior Publication Data
US 2017/0207431 A1    Jul. 20, 2017

(30) Foreign Application Priority Data
Jun. 25, 2014  (DE) .................. 10 2014 212 143

(51) Int. Cl.
*H01M 4/02* (2006.01)
*H01M 2/10* (2006.01)
(Continued)

(52) U.S. Cl.
CPC ....... *H01M 2/1077* (2013.01); *H01M 2/0202* (2013.01); *H01M 2/0237* (2013.01);
(Continued)

(58) Field of Classification Search
CPC ..................................................... H01M 2/02
See application file for complete search history.

(56) References Cited

U.S. PATENT DOCUMENTS

| | | | |
|---|---|---|---|
| 2012/0114997 A1 | 5/2012 | Chen et al. | |
| 2013/0149574 A1* | 6/2013 | Fries ............. | F28F 13/12 429/71 |
| 2014/0106200 A1* | 4/2014 | Saiki ............. | H01M 2/22 429/121 |

FOREIGN PATENT DOCUMENTS

| | | |
|---|---|---|
| DE | 229413 A | 2/1925 |
| DE | 8021683 U1 | 1/1981 |

(Continued)

OTHER PUBLICATIONS

European Search Report corresponding to international application No. PCT/EP2015/06956, dated Jan. 21, 2016 (6 pages).

*Primary Examiner* — Jacob B Marks
(74) *Attorney, Agent, or Firm* — Maginot, Moore & Beck, LLP

(57) ABSTRACT

Contacting apparatus for contacting an energy storage cell (1) comprising at least one printed circuit board (5) which is provided for discharging the electrical energy stored in the energy storage cell (1), wherein at least one electric pole of the energy storage cell (1) is pressed by a releasable mechanical connection (7) with a specific contact pressing force against an electrically conductive layer (5c) of the at least one printed circuit board (5) which is located on a front side of the at least one printed circuit board (5) facing the energy storage cell (1).

18 Claims, 12 Drawing Sheets

(51) Int. Cl.
*H01M 2/02* (2006.01)
*H01M 2/20* (2006.01)
*H01M 10/613* (2014.01)
*H01R 12/70* (2011.01)
*H01M 10/625* (2014.01)
*H01R 11/28* (2006.01)
*H01R 43/26* (2006.01)

(52) U.S. Cl.
CPC ........... *H01M 2/202* (2013.01); *H01M 2/206* (2013.01); *H01M 10/613* (2015.04); *H01M 10/625* (2015.04); *H01R 11/282* (2013.01); *H01R 12/7029* (2013.01); *H01R 43/26* (2013.01); *H01R 12/7076* (2013.01)

(56) References Cited

FOREIGN PATENT DOCUMENTS

| | | |
|---|---|---|
| DE | 102006005842 A1 | 9/2006 |
| DE | 102011055223 B3 | 5/2013 |
| DE | 10 2012 200591 A1 | 7/2013 |
| EP | 2658034 A1 | 10/2013 |
| GB | 2112562 A | 7/1983 |
| WO | 2015197545 A2 | 12/2015 |

\* cited by examiner

CONTACTING APPARATUS FOR CONTACTING AN ENERGY STORAGE CELL

PRIORITY CLAIM AND REFERENCE TO RELATED APPLICATION

This application is a 35 U.S.C 371 National Stage application of PCT/EP2015/063956, filed Jun. 22, 2015, and claiming priority to German Application No. DE 10 2014 212 143.4, filed on Jun. 25, 2014. The entire contents of the above-mentioned patent applications are incorporated herein by reference as part of the disclosure of this U.S. application.

TECHNICAL FIELD

The invention relates to a contacting apparatus for contacting an energy storage cell and in particular a contacting apparatus for frictionally contacting cylindrical round cells with a printed circuit board.

BACKGROUND

In many applications, it is necessary to store electrical energy. In particular for vehicles having an electric drive or electric motor, it is necessary to provide a sufficient electrical charge and to store same in an energy store of the vehicle. Electric vehicles, in particular electric cars or electric bicycles, require efficient electrical storage systems for the drive thereof which provide sufficient electrical energy for an electric drive, in particular for an electric motor. In many cases, lithium-ion accumulators are used for this purpose. In order to provide the required amount of electrical energy, a multiplicity of energy storage cells, in particular battery cells, are combined to form an assemblage or a battery pack. In the case of conventional energy storage apparatuses for storing electrical energy, the energy storage cells are contacted by means of conventional contacting methods, in particular by means of resistance welding, laser welding or clamping. These conventional contacting methods have a relatively high level of complexity, wherein the contacting of the multiplicity of energy storage cells within a housing of an energy store takes a great deal of time and causes considerable manufacturing complexity. Furthermore, the contacted energy storage cells cannot be replaced within an energy storage system produced in this way or can only be replaced at considerable cost. The energy storage cells used in a conventional energy storage system have in part a very high energy density, and therefore the energy storage cells or battery cells can overheat during charging and discharging procedures. However, the energy storage cells contacted with conventional contacting devices offer only relatively restricted options for cooling the energy storage cells sufficiently. Accordingly there is a need to provide a contacting apparatus for contacting an energy storage cells for an energy storage system, which avoids the aforementioned disadvantages of conventional contacting devices and permits reliable frictional electrical and mechanical contacting of energy storage cells.

SUMMARY OF THE INVENTION

Accordingly, the invention provides a contacting apparatus for contacting an energy storage cell comprising at least one printed circuit board which is provided for discharging the electrical energy stored in the energy storage cell, wherein at least one electric pole of the energy storage cell is pressed by a releasable mechanical connection with a specific contact pressing force against an electrically conductive layer of the at least one printed circuit board which is located on a front side of the at least one printed circuit board facing the energy storage cell.

The contacting apparatus in accordance with the invention permits simple and defined positioning of the energy storage cell on the printed circuit board which serves to discharge the electrical energy stored in the energy storage cell.

The releasable mechanical connection produces a defined contact pressing force which can be effected by frictional contacting of the energy storage cell on one side of the energy storage cell, so that the electrical energy stored therein can be discharged by means of a single printed circuit board. As a consequence, the number of printed circuit boards required in an energy storage system is reduced. This leads, in turn, to a saving in terms of weight in the energy storage system, and to a considerable reduction in the manufacturing outlay in the manufacture of the energy storage system, in particular the manufacturing outlay for contacting the energy storage cells with the printed circuit boards.

Moreover, the single-sided contacting of the energy storage cells with a printed circuit board advantageously offers more degrees of freedom for cooling the energy storage cells. For instance, in one possible embodiment after the energy storage cells have been mounted on one side of the printed circuit board by means of the contacting apparatus in accordance with the invention, they can be immersed into a cooling medium container filled with a cooling medium or can have a supplied air stream circulated around them. A further advantage of the contacting apparatus in accordance with the invention resides in the fact that defective energy storage cells can be replaced in a simple manner by reason of the releasable mechanical connection.

In one possible embodiment of the contacting apparatus in accordance with the invention, the releasable mechanical connection has a releasable mechanical clip connection comprising at least one clip.

In an alternative embodiment of the contacting apparatus in accordance with the invention, the releasable mechanical connection has rotary closure, in particular a bayonet closure.

In a further possible embodiment of the contacting apparatus in accordance with the invention, the energy storage cell is a cylindrical energy storage cell which has, in its peripheral surface, at least one circumferential groove, into which at least one clip hook of the at least one clip of the releasable mechanical clip connection latches. For example, the energy storage cell can be a standardised round cell, in particular an 18650-cell which, as a result of the manufacturing process, already has a radial indentation or a circumferential groove on its peripheral surface. This embodiment of the contacting apparatus in accordance with the invention thus makes use of the fact that as a result of the manufacturing process standardised round cells already have circumferential grooves or indentations in their peripheral surface.

In a further possible embodiment of the contacting apparatus in accordance with the invention, the cylindrical energy storage cell has, as a round cell on an end side, a first electric pole, in particular a positive pole with a positive potential, which is pressed by means of the at least one clip of the releasable mechanical clip connection via a contacting disk against an electrically conductive layer of the printed circuit board and is preferably fixed at this location.

In a further possible embodiment of the contacting apparatus in accordance with the invention, the cylindrical energy storage cell has, on its peripheral surface and the other end side, a second electric pole, in particular a negative pole with a negative potential, which is pressed by means of the at least one clip of a further releasable mechanical clip connection via a further contacting disk against an electrically conductive layer of a further printed circuit board.

In a further possible embodiment of the contacting apparatus in accordance with the invention, the at least one clip of the releasable mechanical clip connection has a clip neck, which extends through a corresponding bore in the printed circuit board, and a clip head which engages behind the printed circuit board in order to fix the at least one clip of releasable mechanical clip connection.

In a further possible embodiment of the contacting apparatus in accordance with the invention, a mechanical biassing spring, in particular a plate spring or a spring ring, having a specific biassing force, is provided between the clip head of the at least one clip of the releasable mechanical clip connection and an edge of the bore of the printed circuit board.

In a further possible embodiment of the contacting apparatus in accordance with the invention, the bore of the printed circuit board, through which the clip neck of the at least one clip of the releasable mechanical clip connection extends, is sealed by a seal which prevents the ingress of a fluid, in particular water, from outside towards the energy storage cell.

In a further possible embodiment of the contacting apparatus in accordance with the invention, the seal is pressed outwards when an overpressure is produced on the side of the printed circuit board facing the energy storage cell, so that an overpressure produced on the side of the energy storage cell is decreased.

In a further possible embodiment of the contacting apparatus in accordance with the invention, the at least one clip of the releasable mechanical clip connection is electrically conductive. The at least one electrically conductive clip has an electrically conductive clip neck which by means of a contacting disk lies against the peripheral surface of the cylindrical energy storage cell which has a second electric pole of the energy storage cell, wherein the electrically conductive clip neck extends through a bore of the printed circuit board and the at least one electrically conductive clip contacts the second electric pole of the energy storage cell via its electrically conductive clip neck and its electrically conductive clip head and at least one further contacting disk with an electrically conductive layer which is located on a rear side of the printed circuit board facing away from the energy storage cell.

In a further possible embodiment of the contacting apparatus in accordance with the invention, a mechanical biassing spring, in particular a plate spring or a spring ring, having a specific biassing force, is provided between the electrically conductive clip head of the at least one electrically conductive clip and an edge of the bore of the printed circuit board.

In a further possible embodiment of the contacting apparatus in accordance with the invention, the peripheral surface of the cylindrical energy storage cell which has the second electric pole of the energy storage cell is pressed by means of the releasable mechanical clip connection via a contacting disk against a further separate electrically conductive layer which is likewise located on the front side of the printed circuit board facing the energy storage cell.

In a further possible embodiment of the contacting apparatus in accordance with the invention, the releasable mechanical clip connection has at least one SMD-clip which is soldered onto the electrically conductive layer which is located on the front side facing the energy storage cell.

In a further possible alternative embodiment of the contacting apparatus in accordance with the invention, the releasable mechanical clip connection has at least one SMD-clip which is integrally formed on the printed circuit board.

In a further possible embodiment of the contacting apparatus in accordance with the invention, the energy storage cell is a cylindrical energy storage cell which has, on its peripheral surface, at least one circumferential groove, into which at least one clip hook of the at least one SMD-clip of the releasable mechanical clip connection latches.

In a further possible embodiment of the contacting apparatus in accordance with the invention, the contacting disks consist of an elastic material, in particular of an elastic polymer material which is both electrically and thermally conductive.

Accordingly, the invention provides an energy storage system for storing electrical energy in a plurality of energy storage cells, wherein the energy storage cells are each mounted on a printed circuit board of the energy storage system by means of a contacting apparatus in order to discharge the electrical energy stored in the respective energy storage cell, wherein the contacting apparatus which serves to contact the respective energy storage cell with the printed circuit board has a releasable mechanical connection which presses the energy storage cell with a specific contact pressing force against an electrically conductive layer which is located on a front side of the printed circuit board facing the energy storage cell.

In one possible embodiment of the energy storage system in accordance with the invention, the energy storage cells mounted on the printed circuit board are immersed into a cooling medium container filled with a cooling medium in order to be cooled.

In an alternative embodiment of the energy storage system in accordance with the invention, the energy storage cells mounted on the printed circuit board have an air flow circulated around them in order to be cooled.

Possible embodiments of the contacting apparatus in accordance with the invention and the energy storage system in accordance with the invention will be explained in greater detail hereinafter with reference to the enclosed figures.

DETAILED DESCRIPTION OF EMBODIMENTS

Figure 1:
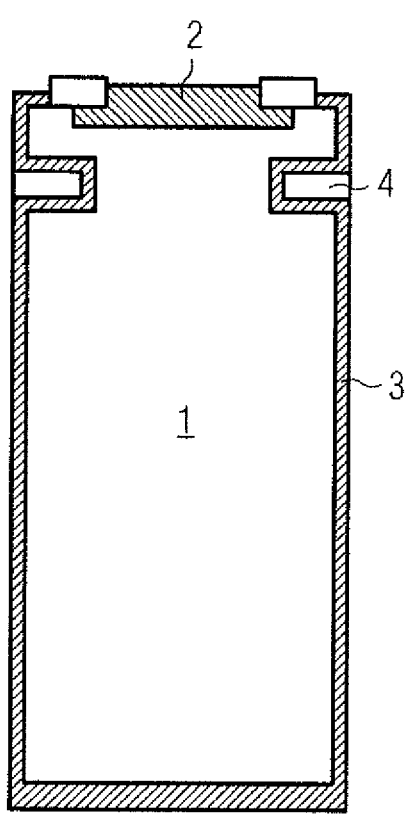
FIG. 1 shows a sketch to illustrate a schematic structure of a cylindrical energy storage cell which can be contacted by the contacting apparatus in accordance with the invention on a printed circuit board.

The contacting apparatus in accordance with the invention serves to contact an energy storage cell, ESZ, in particular a cylindrical energy storage cell or round cell. The contacting apparatus in accordance with the invention is suitable in particular for contacting a cylindrical energy storage cell of design 18650 (diameter 18 mm, length 65 mm) or design 26650 (diameter 26 mm, length 65 mm) or similar standardised cylindrical energy storage cells, as schematically illustrated in FIG. 1. Such an energy storage cell 1 has two end sides and one peripheral surface. The energy storage cell 1 illustrated in FIG. 1 has an electric positive pole 2 with a positive potential. The positive electric pole 2 illustrated in FIG. 1 is located in an electrically insulated manner in a metal cup 3 of the energy storage cell 1, which cup forms a second electric pole, namely a negative pole with a negative electrical potential. The first electric pole 2 is electrically insulated from the second electric pole 3 of the energy storage cell 1, as indicated in FIG. 1. Located within the cup or housing 3 of the energy storage cell 1 is the active material of the cell which stores the electrical energy. The individual energy storage cell is heated in the active material which is rolled e.g. in a so-called "jelly roll". The active material is located within the metallic cup 3 of the energy storage cell 1 which consists e.g. of steel or a similar material.

Figure 2:
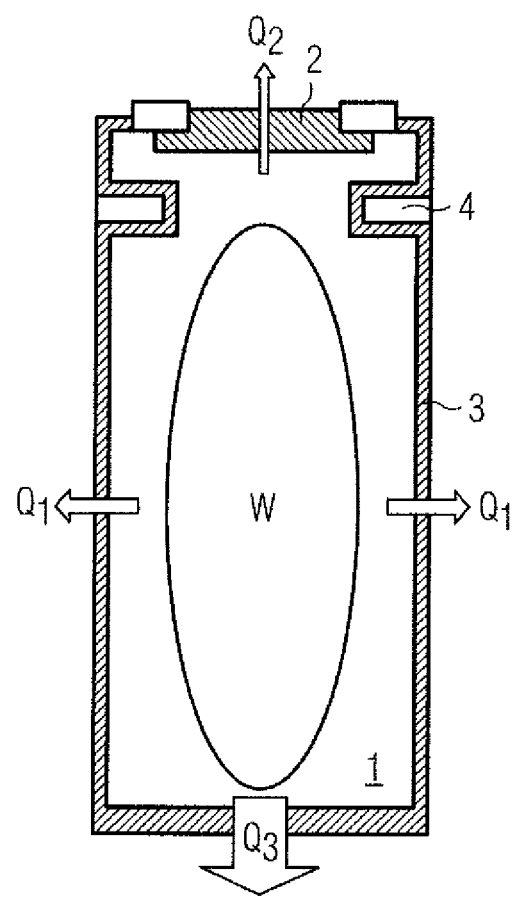
FIG. 2 shows a sketch to illustrate a heat discharge in a cylindrical energy storage cell shown in FIG. 1.

FIG. 2 schematically shows a heat dissipation in the cylindrical energy storage cell 1 illustrated in FIG. 1. The heat is produced within the active material, wherein the produced heat W can be discharged via heat flows Q. As illustrated in FIG. 2, the heat W produced internally is dissipated or discharged via the peripheral casing 3 or the cup 3 via a heat flow Q1. Furthermore, the produced heat W can be discharged via the cell base of the energy storage cell 1 via a heat flow Q3. Furthermore, it is possible to discharge a portion of the produced heat W via a heat flow Q2 via the upper end side illustrated in FIG. 2. However, in many cases the heat release via the heat flow Q2 via the upper part of the energy storage cell 1 illustrated in FIG. 2 is low by reason of the design of the cylindrical energy storage cell 1, since e.g. standardised cylindrical battery cells of design 18650, 26650 etc. have cavities located therein which contain air which constitutes a good heat insulator. Also, the heat dissipation in the radial direction via the heat flow Q1 is limited because many transition resistances between cathodes, anodes and separator layers of the rolled-up active material must be overcome which render the thermal flow in the radial direction more difficult. The produced heat is mostly dissipated via the heat flow Q3 illustrated in FIG. 2 via the base side of the energy storage cell 1. The intensity/quantity of the possible heat dissipations via the different heat flows Q1, Q2 and Q3 is indicated in the schematic graphic illustrated in FIG. 2 by the corresponding arrow thicknesses.

As can be seen in FIGS. 1, 2, the illustrated cylindrical energy storage cell 1 has a circumferential indentation or groove 4 in its peripheral surface or peripheral cup 3.

The contacting apparatus in accordance with the invention can be used for contacting a cylindrical energy storage cell 1, as illustrated in FIGS. 1, 2, with at least one printed circuit board, LP, which discharges the electrical energy stored in the energy storage cell 1 to a load or to a consumer.

Various embodiment variants of the contacting apparatus in accordance with the invention for contacting an energy storage cell 1 with at least one printed circuit board will be described hereinafter.

Figure 3:
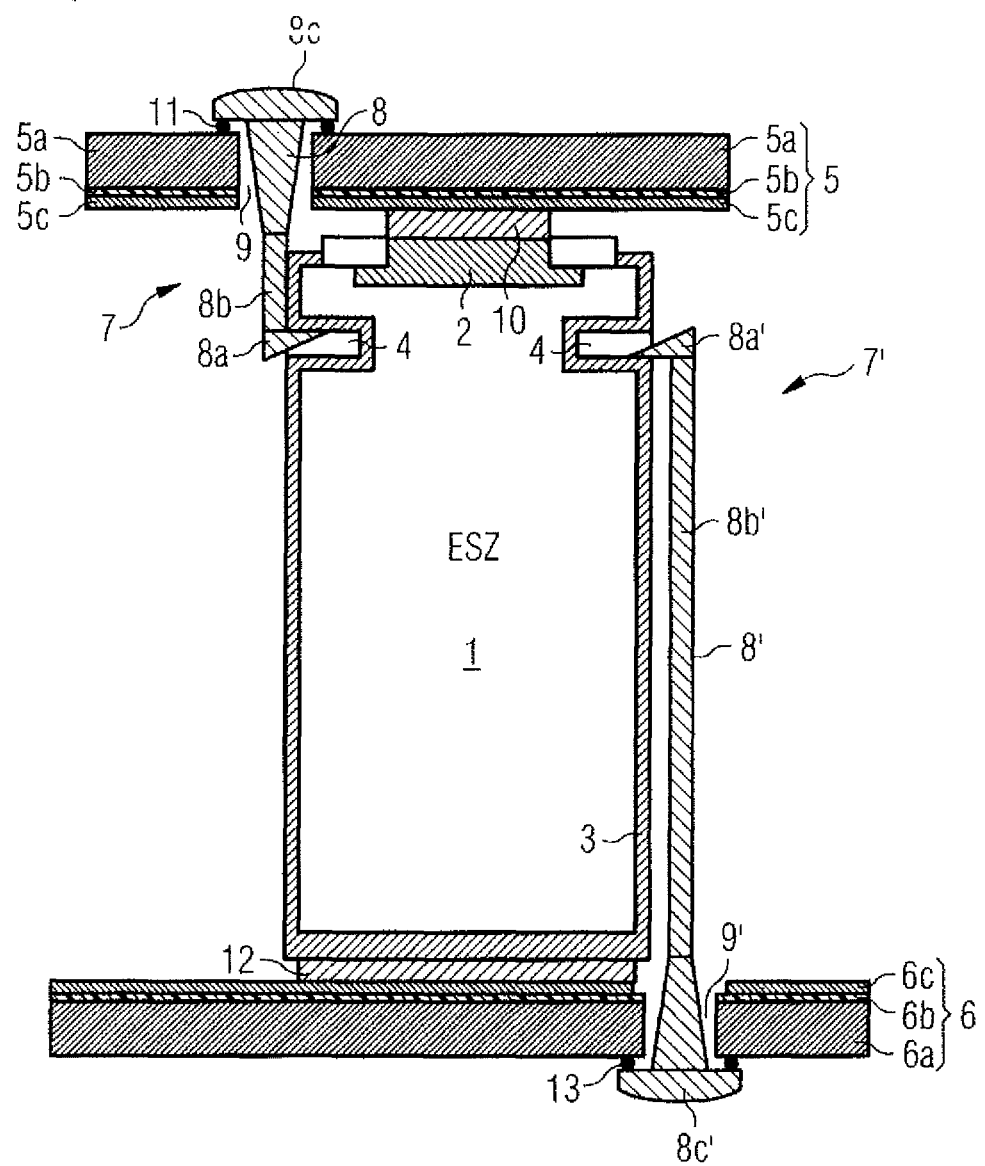
FIG. 3 shows a schematic view of an embodiment variant of the contacting apparatus in accordance with the invention.

FIG. 3 shows a first embodiment variant of the contacting apparatus in accordance with the invention for contacting an energy storage cell 1 with a printed circuit board 5, 6. In the case of the first embodiment variant illustrated in FIG. 3, the electric positive pole 2 of the energy storage cell 1 is contacted with a first printed circuit board 5 and the negative pole 3 of the energy storage cell 1 is contacted with a second printed circuit board 6 by means of two releasable mechanical clip connections 7, 7'. As can be seen in FIG. 3, the upper printed circuit board 5 illustrated therein has a plurality of layers, namely a first layer 5a which is formed by an aluminium core or epoxide core, an electrically insulating insulation layer 5b and an electrically conducting or electrically conductive layer 5c which consists e.g. of copper or other conductive material. The first electric, positive pole 2 of the energy storage cell 1 is pressed by means of the releasable mechanical connection 7 with a specific contact pressing force F against the electrically conductive layer 5c of the printed circuit board 5 and is fixed at this location. As illustrated in FIG. 3, the electrically conductive layer 5c of the printed circuit board 5 is located on a front side of the printed circuit board 5 facing the energy storage cell 1. In the case of the exemplified embodiment illustrated in FIG. 3, the releasable mechanical connection 7 is a mechanical clip connection 7 which has a clip 8. As illustrated in FIG. 3, the clip 8 has a clip hook 8a which engages and latches into the circumferential groove 4 of the energy storage cell 1. The clip hook 8a of the clip 8 is connected to a clip head 8c via a clip neck 8b. In the case of the embodiment variant illustrated in FIG. 3, the clip 8 of the releasable mechanical clip connection 7 is inserted through a bore 9 through the printed circuit board 5, wherein the clip head 8c engages behind the printed circuit board 5 in order to fix the clip 8. The clip 8 of the releasable mechanical clip connection 7 presses the energy storage cell 1 with a specific predetermined contact pressing force of e.g. 0.01 to 0.3 Newtons via a contacting disk 10 against the electrically conductive layer 5c of the upper printed circuit board 5. The contacting disk 10 consists preferably of an elastic material, in particular of an elastic polymer material, which is both electrically and thermally conductive. As can be seen in FIG. 3, in the case of the illustrated embodiment variant a seal 11 which prevents the ingress of a fluid, in particular of moisture, from the outside towards the energy storage cell 1 is located between the clip head 8c of the clip 8 of the releasable mechanical clip connection 7 and an edge of the bore 9 of the printed circuit board 5. In one possible embodiment, this seal 11 can be pressed outwards preferably by the production of an overpressure on a side of the printed circuit board 5 facing the energy storage cell 1, so that an overpressure produced on sides of the energy storage cell 1 is reduced. The seal 11 optionally provided in FIG. 3 seals the energy storage system to prevent the ingress of liquid. By producing an overpressure at one energy storage cell 1, an escaping gas can be discharged to the outside via the bore 9 optionally after pressing out the seal 11.

In the case of the embodiment variant illustrated in FIG. 3, the negative pole 3 with a negative electrical potential is contacted with the lower printed circuit board 6 by means of a further releasable mechanical connection 7' which has one or a plurality of mechanical clip connections 8'. In the case of the exemplified embodiment illustrated in FIG. 3, the second lower printed circuit board 6 likewise has three layers, namely an electrically conductive layer 6c facing the energy storage cell 1, an insulation layer 6b and a carrier layer 6a consisting of aluminium or epoxide. The negative pole 3 on the base side of the energy storage cell 1 is contacted by means of a further contacting disk 12 which lies on the electrically conductive layer 6c of the second printed circuit board 6, as illustrated in FIG. 3. A seal or a sealing ring 13 can also be provided between the clip head 8c' of the clip 8' of the releasable mechanical clip connection 7' and an edge of the bore 9' of the printed circuit board 6.

Figure 4:
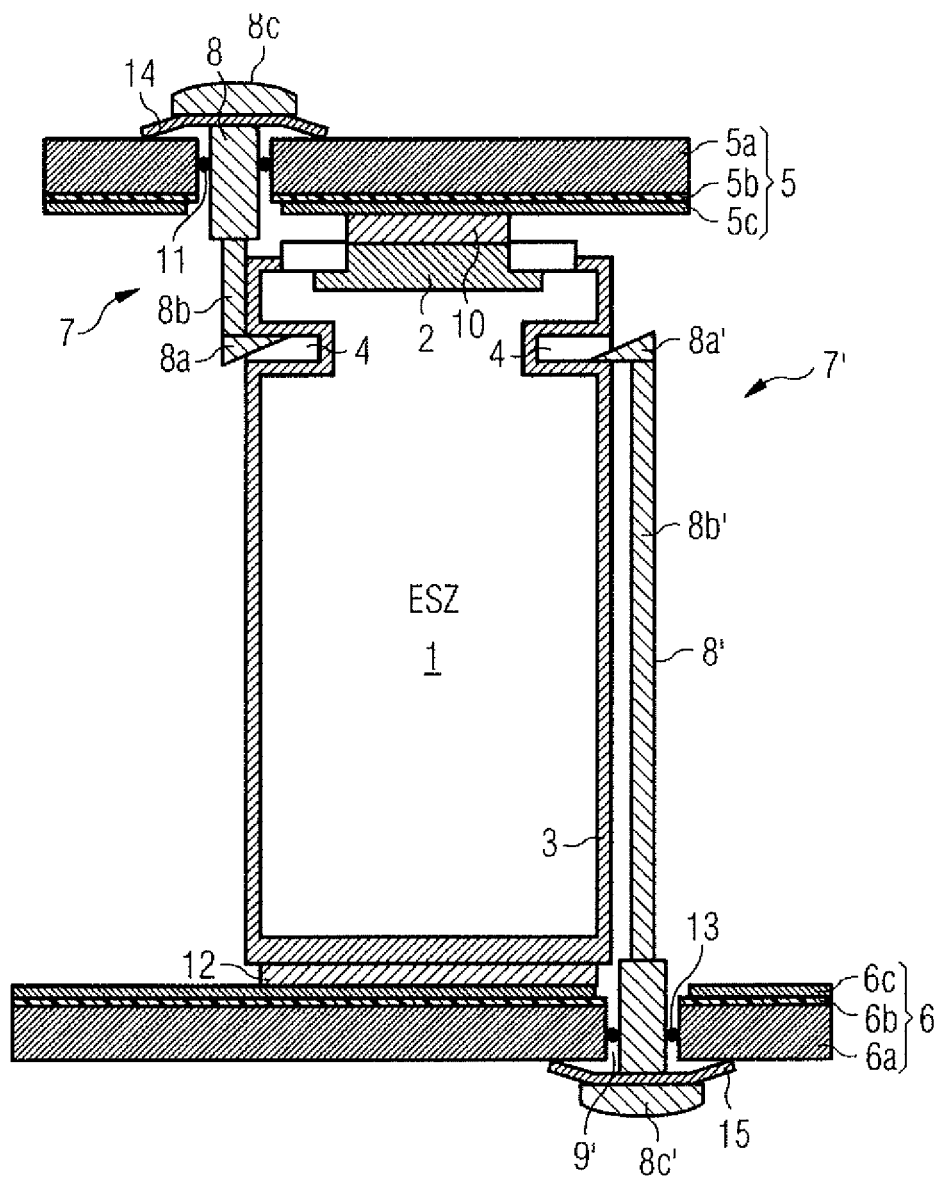
FIG. 4 shows a schematic view of a further embodiment variant of the contacting apparatus in accordance with the invention.

FIG. 4 shows a further second embodiment variant of the contacting apparatus in accordance with the invention for contacting an energy storage cell 1. The embodiment variant illustrated in FIG. 4 resembles the first embodiment variant illustrated in FIG. 3, wherein in addition a mechanical biasing spring 14, 15 is provided at the bores 9, 9' of the two printed circuit boards 5, 6. The biasing springs 14, 15 each provide a specific biasing force. The biasing springs 14, 15 can be e.g. a plate spring or a spring ring or the like. In the case of the second embodiment variant illustrated in FIG. 4, the sealing rings 11, 13 are also located within the bores 9, 9' of the two printed circuit boards 5, 6. The two biasing springs 14, 15 render it possible for the contact pressing force to be formed more independently of the manufacturing tolerances.

Figure 5:
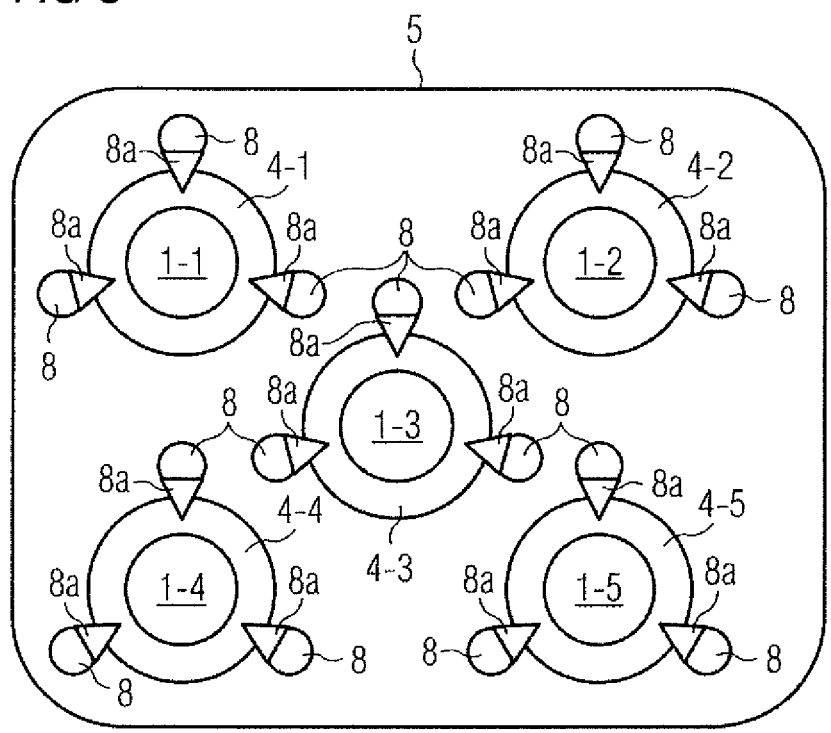
FIG. 5 shows a schematic view of a plurality of energy storage cells mounted on a printed circuit board by means of contacting apparatuses in accordance with the invention.

FIG. 5 shows a schematic view of one side of a printed circuit board 5 facing the energy storage cells 1. As schematically illustrated in FIG. 5, in the illustrated example five energy storage cells 1-1, 1-2, 1-3, 1-4, 1-5 are mounted on one side of a printed circuit board 5, e.g. on the upper printed circuit board 5 illustrated in FIGS. 3, 4. FIG. 5 schematically illustrates the circumferential groove 4-i, which is present in the respective energy storage cells 1-i, as a ring. In each case, one clip hook 8a of three clips 8 of a releasable mechanical connection 7 latches into the circumferential groove 4-i of an energy storage cell 1-i, said clip hooks being preferably uniformly spaced apart and forming a triangle or forming in pairs an angle segment of 120°. In the case of the example illustrated in FIG. 5, each energy storage cell 1-i is thus held by three mechanical clip connections 7, of which the clip hooks 8a latch into the associated groove 4-i of the energy storage cell 1-i. The clips 8 produce the necessary contact pressing force, in order to press the energy storage cell 1 against the printed circuit board 5 via the elastic contacting disk 10. The clip heads 8c of the clips 8 lie, on the upper side or on the side of the printed circuit board 5 facing away from the energy storage cells 1-i, on the layer 5a consisting of aluminium or epoxide resin. The clip heads 8c lying thereon are connected to the clip hooks 8a illustrated in FIG. 5 via the clip necks 8b inserted through the bores 9, said clip hooks engaging or latching into the circumferential groove 4-i of the respective energy storage cell 1. A corresponding arrangement can also be provided for the negative poles of the energy storage cells 1-i, as illustrated in FIG. 4, if the clip necks 8b' of the clip connections 7' have a corresponding length.

Figure 6:
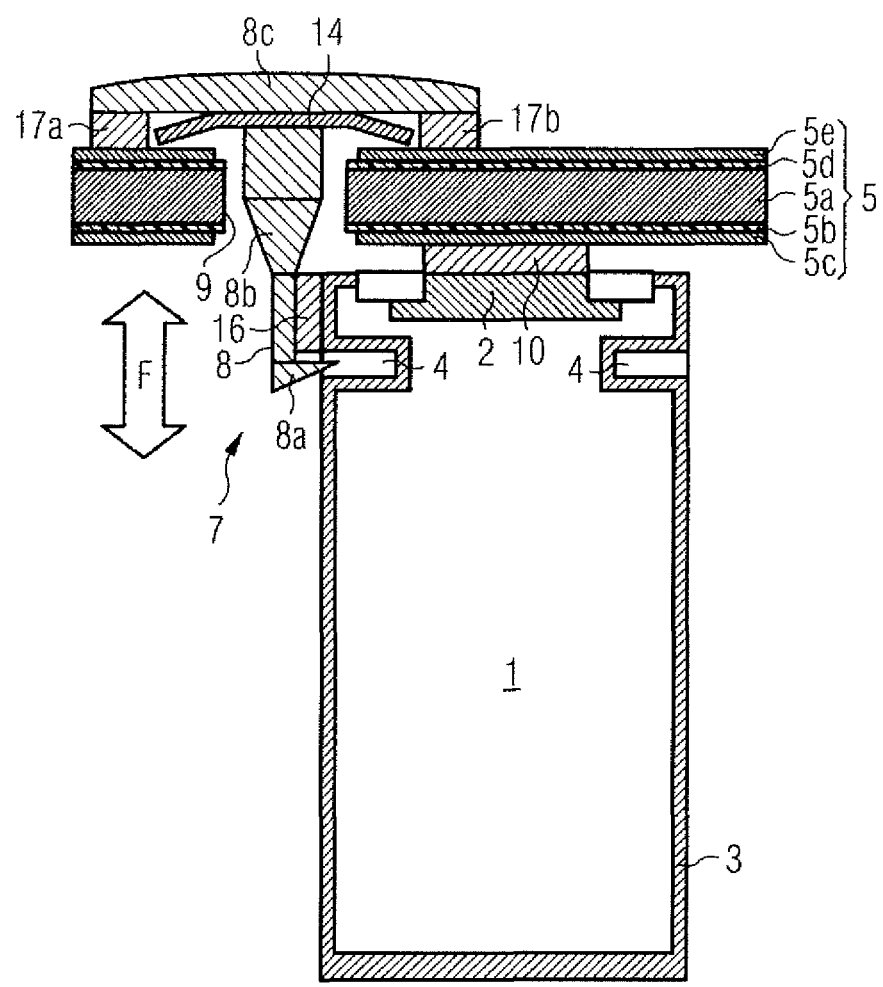
FIG. 6 shows a schematic view of a further embodiment variant of the contacting apparatus in accordance with the invention.

FIG. 6 shows a further third embodiment variant of the contacting apparatus in accordance with the invention for contacting an energy storage cell 1. In the third embodiment variant illustrated in FIG. 6, the positive pole 2 and also the negative pole 3 are contacted with a single printed circuit board 5. The positive pole 2 is contacted on the underside of the printed circuit board 5 and the negative pole 3 of the energy storage cell 1 is contacted on the upper side of the printed circuit board 5. As illustrated in FIG. 6, the positive pole 2 of the energy storage cell 1 is pressed via the contacting disk 10 against the electrically conductive layer 5c of the printed circuit board 5, which consists e.g. of copper, with a specific contact pressing force by the releasable mechanical connection 7. In the case of the embodiment illustrated in FIG. 6, the printed circuit board 5 has an additional second insulation layer 5d and a further electrically conductive layer 5e which is located on the side of the printed circuit board 5 facing away from the energy storage cell 1. In the case of the exemplified embodiment illustrated in FIG. 6, the mechanically releasable connection 7 has one or a plurality of clips 8 consisting of an electrically conductive material. The clip 8 has a clip hook 8a which engages and latches into the circumferential groove 4 of the energy storage cell 1. The clip hook 8a is connected to an electrically conductive clip head 8c of the clip 8 via a clip neck 8b of the electrically conductive clip 8. The clip neck 8b of the electrically conductive clip 8 lies via an electrically conductive contacting disk 16 against the peripheral surface of the energy storage cell 1 which forms the negative pole. Furthermore, the clip head 8c of the electrically conductive clip 8 lies via electrically conductive contact disks 17a, 17b or by means of a contact disk ring on the electrically conductive copper layer 5e of the printed circuit board 5.

In this manner, the electrically conductive clip 8 establishes an electrical connection between the peripheral surface 3 of the energy storage cell 1 and the electrically conductive layer 5e which is located on the upper side or on the side of the printed circuit board 5 facing away from the energy storage cell 1. A spring element or a biasing spring 14 can be provided between the clip head 8c and the edge of the bore 9, as illustrated in FIG. 6. In the case of the embodiment variant illustrated in FIG. 6, the energy storage cell 1 is mounted with its plus and negative poles on a printed circuit board 5 and is electrically contacted therewith. The steel cup which forms the negative pole 3 of the energy storage cell 1 is pressed against the clip 8 via an electrically conductive elastic contact disk 16 consisting e.g. of a conductive polymer and is then electrically contacted via the electrically conductive clip 8 with the upper side of the printed circuit board 5 in turn with an electrically conductive contact disk 17a, 17b. The third embodiment variant illustrated in FIG. 6 offers the particular advantage that for cooling purposes the lower part of the energy storage cell 1, i.e. the cup 3, is exposed and can be immersed e.g. into a cooling medium container. A further advantage of the embodiment variant illustrated in FIG. 6 resides in the fact that only one single printed circuit board 5 is required for discharging the electrical energy stored in the energy storage cell 1 and therefore the number of printed circuit boards in an energy storage system can be reduced. A further advantage of the embodiment variant illustrated in FIG. 6 resides in the fact that the energy storage cell 1 can be mounted on the the printed circuit board 5 in a particularly simple and time-saving manner. A further advantage of the third embodiment variant illustrated in FIG. 6 resides in the fact that the two different poles 2, 3 of the energy storage cell 1 are connected to electrically conductive layers 5c, 5e which are located on different sides of the printed circuit board 5, so that the risk of short-circuits is reduced. A further advantage of the embodiment variant illustrated in FIG. 6 resides in the fact that defective energy storage cells 1 can be replaced in a particularly simple manner and in a short time because the energy storage cells 1 are accessible in a simple manner from one side of the printed circuit board 5.

Figure 7:
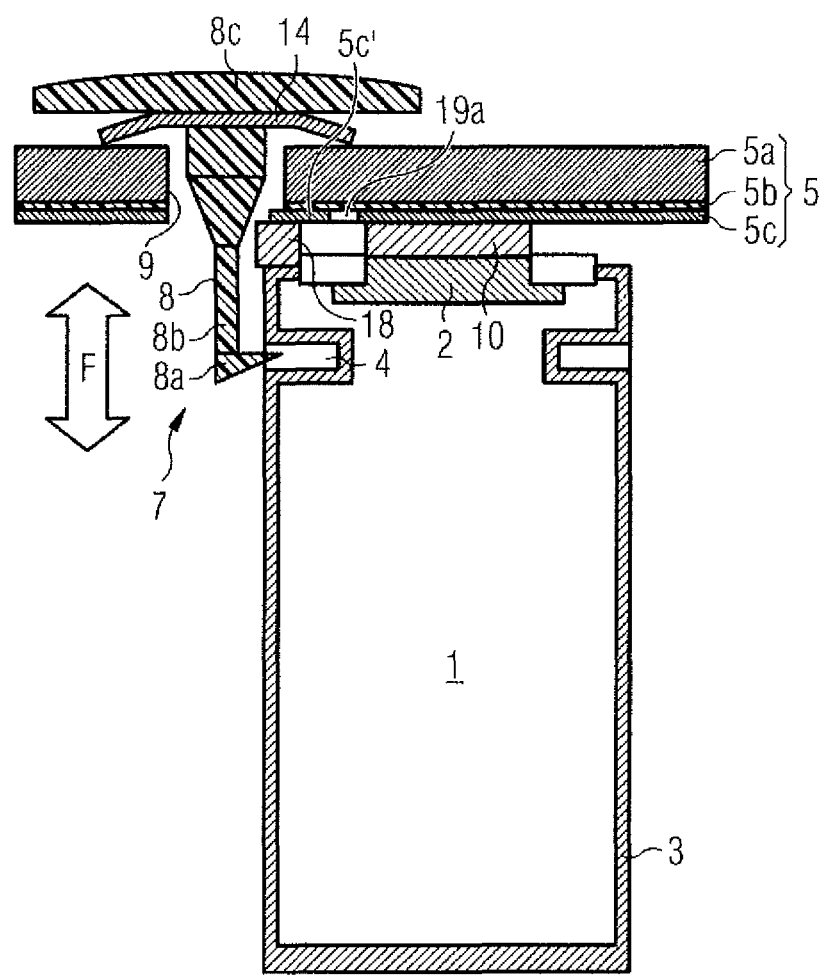
FIG. 7 shows a schematic view of a further embodiment variant of the contacting apparatus in accordance with the invention.

FIG. 7 shows a further fourth embodiment variant of the contacting apparatus in accordance with the invention for contacting an energy storage cell 1. In the case of the fourth embodiment variant illustrated in FIG. 7, the plus and negative poles 2, 3 of the energy storage cell 1 are likewise contacted with a single printed circuit board 5, wherein, however, in contrast to the embodiment variant illustrated in FIG. 6, the positive pole 2 and the negative pole 3 of the energy storage cell 1 are contacted on the side of the printed circuit board 5 facing the energy storage cell 1. In the case of the embodiment variant illustrated in FIG. 7, it is not necessary that the clip connection 7 is electrically conductive because the clip connection 7 provides merely one contacting pressure. The steel cup 3 which forms the negative pole of the energy storage cell 1 is contacted, in the case of the embodiment variant illustrated in FIG. 7, via an electrically conductive contact disk 18 with a further electric layer 5c' which is electrically insulated by an insulation 19a of the first electrically conductive layer 5c of the printed circuit board 5. The positive pole 2 of the energy storage cell 1 is connected to the electrically conductive layer 5c of the printed circuit board 5 by means of an elastic, electrically conductive contacting disk 10, as in the case of the other embodiment variants, and is mechanically pressed against the printed circuit board 5 with a predetermined contact pressing force by the clip connection 7.

In the case of the embodiment variant illustrated in FIG. 7, a spring element 14 for providing a biasing force can likewise be provided. It can be a plate spring or a spring ring. The fourth embodiment variant illustrated in FIG. 7 likewise has the advantage that for cooling purposes the lower part of the energy storage cell 1 is exposed and only one printed circuit board 5 is required for discharging the electrical energy stored in the energy storage cell 1. In comparison with the embodiment variant illustrated in FIG. 6, the embodiment variant illustrated in FIG. 7 has the advantage that the clip connection 7 does not have to consist of an electrically conductive material and therefore can be produced from a cost-effective synthetic material. Furthermore, in the case of the fourth embodiment variant illustrated in FIG. 7 the printed circuit board 5 has merely one side which is coated with electrically conductive layers 5c, 5c'. As a result, the safety during assembly or mounting can be increased.

Further embodiment variants of the contacting apparatus in accordance with the invention will be described hereinafter, in which the releasable mechanical clip connection 7 is formed by SMD-clips 8 which are located on a front side of the printed circuit board 5 facing the energy storage cell 1. In the case of these embodiments, the releasable mechanical clip connection 7 is designed as an SMD (Service Mounted Device). The releasable mechanical connection 7, in particular the releasable mechanical clip connection 7, can be connected to the printed circuit board 5 by means of a soldered, welded or screw connection.

In the case of these embodiment variants, the clip 8 or the releasable mechanical clip connection 7 is no longer inserted through the printed circuit board but instead is soldered or brazed onto or with a layer of the printed circuit board.

Figure 8:
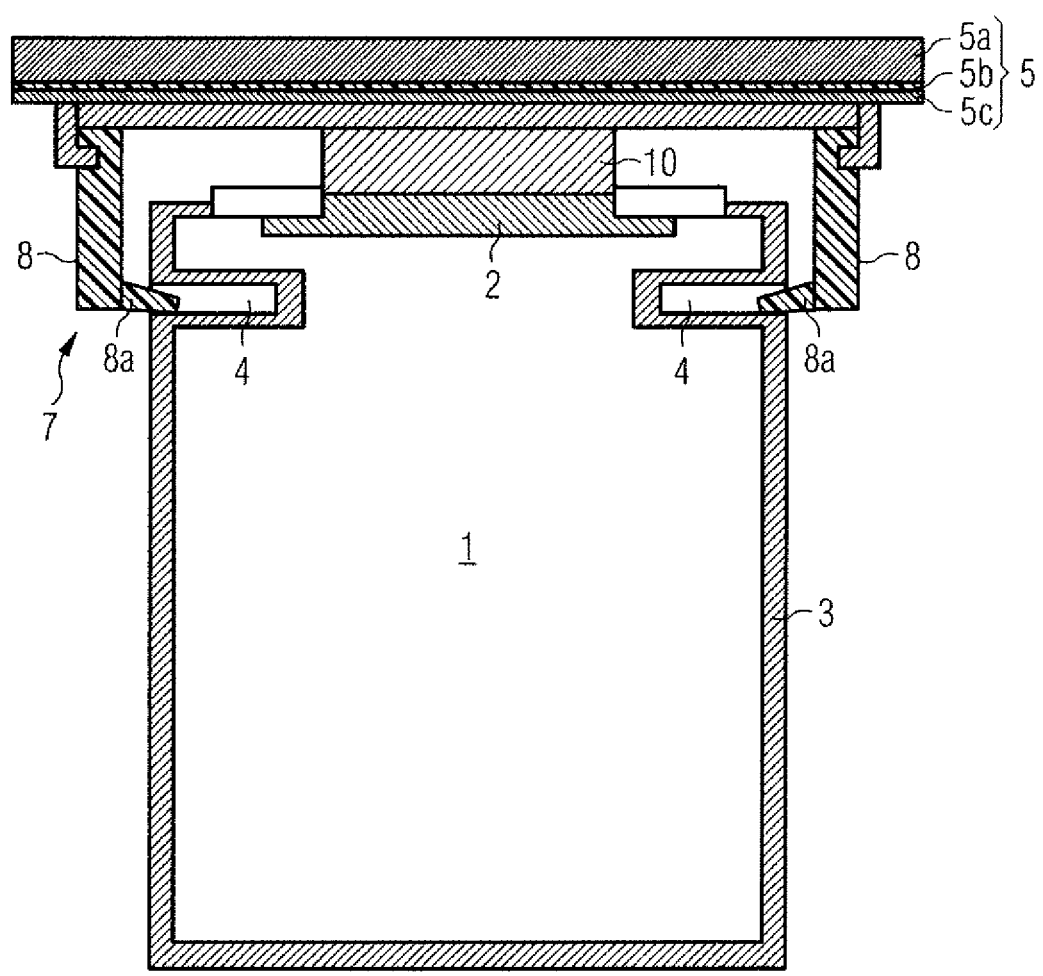
FIG. 8 shows a schematic view of a further embodiment variant of the contacting apparatus in accordance with the invention.

FIG. 8 shows a fifth embodiment variant of the contacting apparatus in accordance with the invention comprising an SMD (Service Mounted Device)-clip 8 having a clip hook 8a which engages into the circumferential groove 4 of the energy storage cell 1. In the case of this embodiment variant, the SMD-clip 8 engages with its clip hook 8a into the outer groove 4 of the energy storage cell 1 and thus produces a defined contact pressing force F. In the case of the embodiment variant illustrated in FIG. 8, the clip 8 is attached, e.g. soldered, to the electrically conductive layer 5c which consists e.g. of copper. THE SMD-clip 8 can consist e.g. of a non-metallic material which is provided on a metallic carrier of the SMD-clip 8 which, for its part, is soldered to the electrically conductive layer 5c of the printed circuit board 5. In the case of the embodiment variant illustrated in FIG. 8, the negative pole 3 can be contacted via a second printed circuit board (not illustrated).

Figure 9:
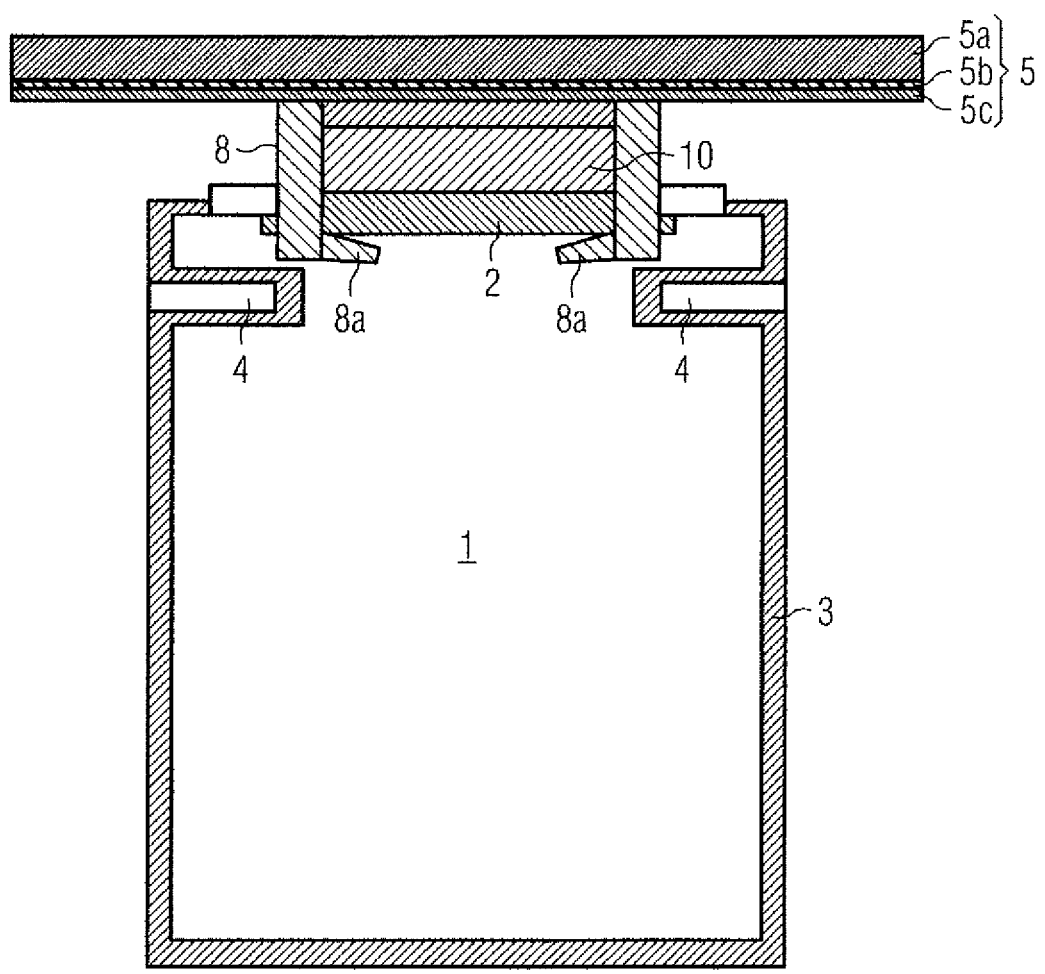
FIG. 9 shows a schematic view of a further embodiment variant of the contacting apparatus in accordance with the invention.

FIG. 9 shows a further sixth embodiment variant of the contacting apparatus in accordance with the invention, in which the SMD-clips 8 of the releasable mechanical clip connection 7 engage at the positive pole 2 of the energy storage cell 1. In the case of this embodiment variant, the positive pole 2 of the energy storage cell 1 has holes which are produced during manufacture and into which a clip hook 8a of an SMD-clip 8 can latch in each case. A required contact pressing force F can be produced in this manner. In the case of the embodiment variant illustrated in FIG. 9, the SMD-clip 8 consists of a metallic, electrically conductive material. The metallic SMD-clip 8 is soldered or fixedly soldered to the copper layer 5c of the printed circuit board 5. In the case of the embodiment variant illustrated in FIG. 9, the negative pole 3 of the energy storage cell 1 is preferably contacted by means of a further printed circuit board, not illustrated.

Figure 10:
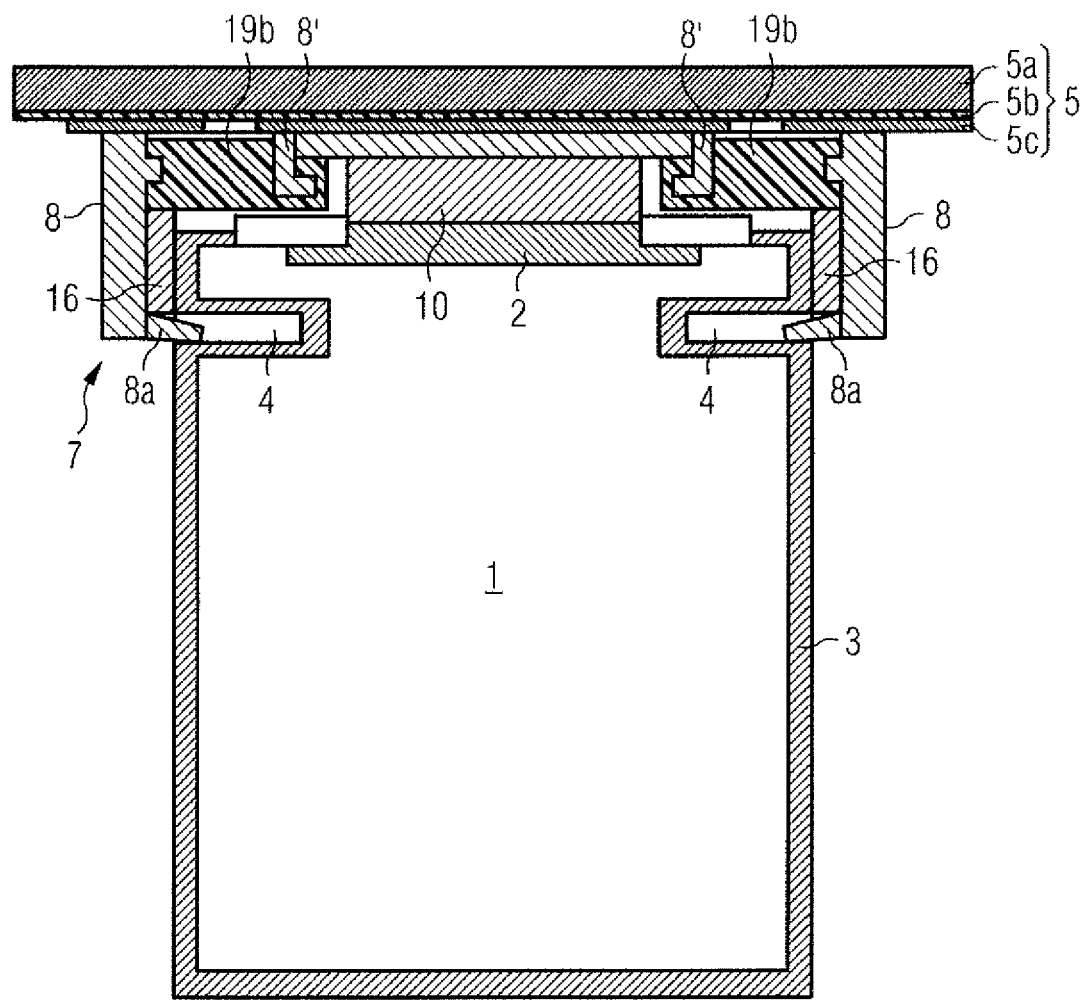
FIG. 10 shows a schematic view of a further embodiment variant of the contacting apparatus in accordance with the invention.

FIG. 10 shows a further seventh embodiment variant of the contacting apparatus in accordance with the invention. In the case of this embodiment variant, the SMD-clips 8 engage into an outer groove 4 of the energy storage cell 1. Both the positive pole 2 and the negative pole 3 are contacted by means of the SMD-clips 8 with a single printed circuit board 5. In the case of the embodiment variant illustrated in FIG. 10, the releasable mechanical connection 7 thus has at least two SMD-clips 8, 8' which each comprise an electrically conductive component and contact the positive pole 2 and the negative pole 3 of the energy storage cell 1. The releasable mechanical connection 7 has an inner clip 8' for the positive pole 2 and an outer clip 8 for the negative pole 3 of the energy storage cell 1. An electrically insulating layer or an electrically insulating component 19b is provided between the two electrically conductive components which form the two SMD-clips 8, 8'. In the case of the embodiment illustrated in FIG. 10, the positive pole 2 is contacted via the upper side or end side of the energy storage cell 1 and the negative pole 3 is contacted laterally.

Figure 11:
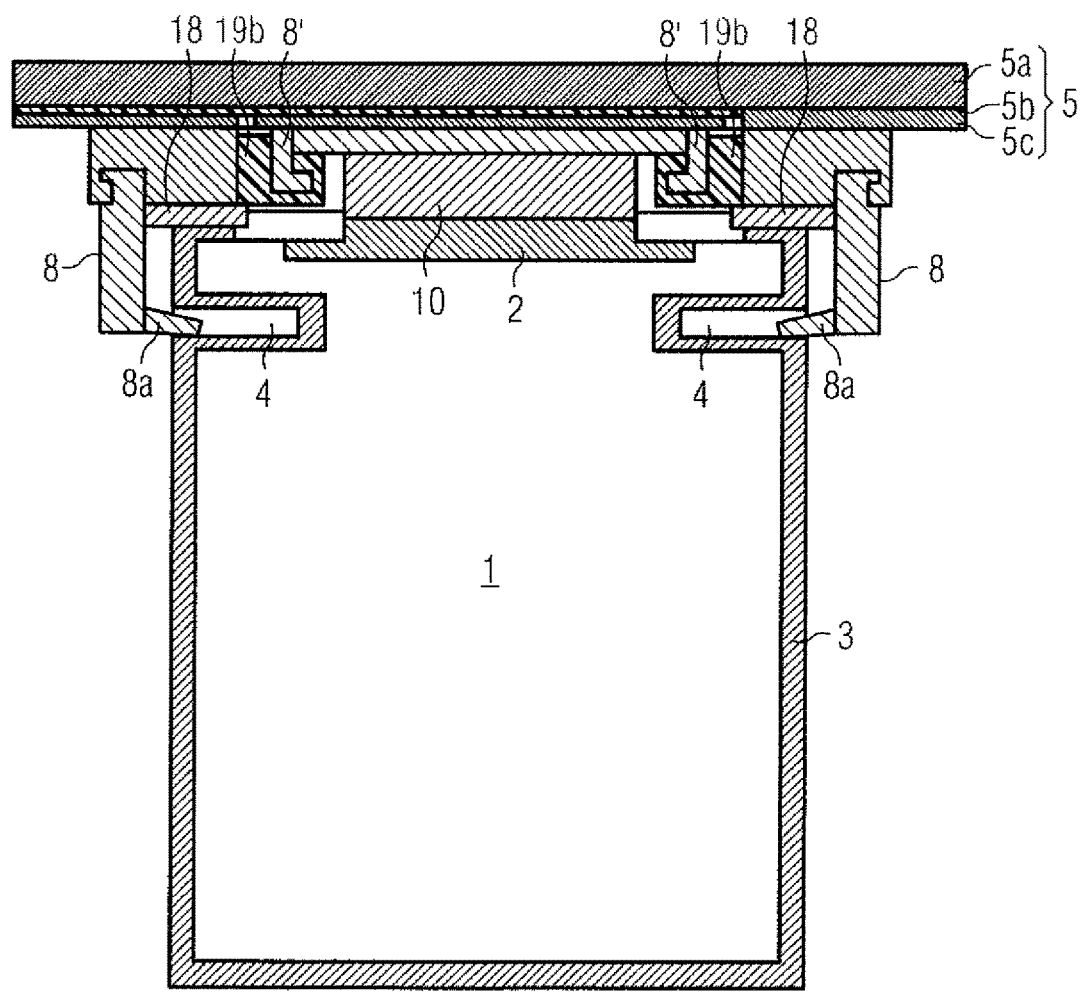
FIG. 11 shows a schematic view of a further embodiment variant of the contacting apparatus in accordance with the invention.

FIG. 11 shows a further eighth embodiment variant of the contacting apparatus in accordance with the invention. In the case of this embodiment variant, a SMD-clip 8 likewise engages into the outer groove 4 of the energy storage cell 1. Both the positive pole 2 and the negative pole 3 of the energy storage cell 1 are contacted with a printed circuit board 5 by means of SMD-clips 8, 8' which each comprise an electrically conductive component. Again, an electrically insulating layer or an electrically insulating component 19b is provided between the two electrically conductive components. In the case of the eighth embodiment variant illustrated in FIG. 11, the positive pole 2 and the negative pole 3 of the energy storage cell 1 are contacted from the upper side or end side. The negative pole 3 is contacted in the radial direction further on the outside, whereas the positive pole 2 is contacted on the end side of the energy storage cell 1 in the centre.

Figure 12:
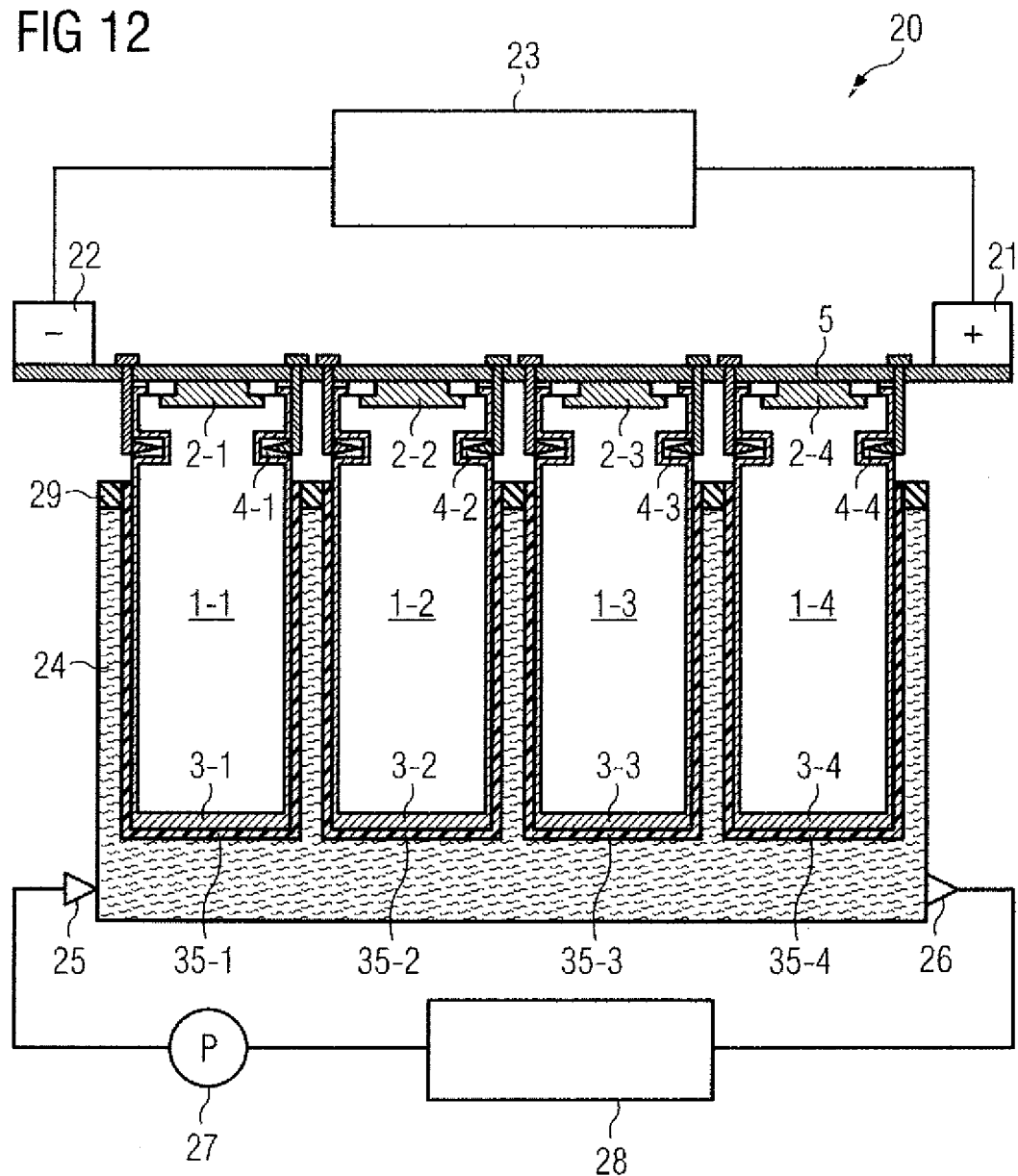
FIG. 12 shows a schematic view of an exemplified embodiment of an energy storage system in accordance with the invention comprising a plurality of energy storage cells.

The contacting apparatuses for contacting energy storage cells 1, as illustrated in the various embodiments, can be used in an energy storage system 20. FIG. 12 schematically shows an exemplified embodiment of an energy storage system 20 which can contain a multiplicity of energy storage cells 1-$i$. In the case of the exemplified embodiment illustrated in FIG. 12, four energy storage cells 1-1, 1-2, 1-3, 1-4 are connected via contacting apparatuses in accordance with the invention to a printed circuit board 5 for discharging the electrical energy, which is stored in the energy storage cells 1-$i$, in a discharging procedure. The energy storage cells 1-$i$ can also be charged via the printed circuit board 5 in a charging procedure. In the case of the embodiment variant illustrated in FIG. 12, all of the energy storage cells 1-$i$ are connected to a single printed circuit board 5, i.e. both the positive pole 2-$i$ and the negative pole 3-$i$ of the respective energy storage cell 1-$i$ are electrically connected to an electrically conductive layer of the printed circuit board 5. For example, the third embodiment variant of the contacting apparatus illustrated in FIG. 6 or the fourth embodiment variant of the contacting apparatus illustrated in FIG. 7 can be used for this purpose. The positive poles 2-$i$ of the electric storage cells 1-$i$ are connected to a positive tap pole 21 of the energy storage system 20 via the printed circuit board 5. The negative poles 3-$i$ of the energy storage cells 1-$i$ are connected to a negative tap pole 22 of the energy storage system 20 via electrically conductive layers of the printed circuit board 5. An external consumer or a load 23 is located between the two tap poles 21, 22 of the energy storage system 20. Alternatively, the provided direct voltage can also be applied to an inverter. In the case of the exemplified embodiment illustrated in FIG. 12, the energy storage cells 1-$i$ are immersed into a cooling medium container 24 which is filled with a liquid cooling medium and is filled e.g. with cooling water. This cooling medium container 24 has an inlet valve 25 and an outlet valve 26, via which it is connected to a cooling circuit. A pump 27 serves to circulate the cooling medium and pumps the cooling medium through the cooling circuit, in particular through the cooling medium container 24. An external cooling body 28 or a heat exchanger can be provided in the cooling circuit. Seals 29 for enclosing the energy storage cells 1-$i$ can be provided between the energy storage cell housings or cups 3-$i$. The energy storage cells 1-$i$ are electrically connected to the printed circuit board 5 via the contacting apparatuses or connecting elements. Both the positive poles 2-$i$ and the negative poles 3-$i$ of the energy storage cells 1-$i$ are contacted via the printed circuit board 5. The printed circuit board 5 has a corresponding layout which offers the desired connection of the energy storage cells 1-$i$ to the negative tap pole 22 and to the positive tap pole 21 of the energy storage system 20. The connecting elements provide the required contact pressure in order to press the energy storage cell 1 against the printed circuit board 5 and fix it at that location. In order to cool the energy storage cells 1-$i$, the lower parts of the housings of the energy storage cells 1-$i$ are preferably each surrounded by an electrical insulation 35-$i$, in order to avoid short-circuits. This is required primarily if the energy storage cells 1-$i$ are connected serially because then different electrical potentials occur between the serially connected energy storage cells 1-$i$. The surrounded energy storage cells 1-$i$ are located in the cooling medium container 24 which is filled with cooling medium and which absorbs the heat of the energy storage cells 1-$i$ dissipated via the periphery 3-$i$ and the cell base of the energy storage cells 1-$i$. In order to cool the cooling medium, an external cooling circuit having the inlet and outlet valves 25, 26, the cooling body 28 and the pump 27 can be provided. In one possible embodiment variant, the temperature T of the cooling medium is measured and is regulated to an optimum operating temperature by activating the cooling pump 27. The embodiment variant illustrated in FIG. 12 permits particularly effective cooling of the multiplicity of energy storage cells 1-$i$, so that energy storage cells having a particularly high power density can be used.

Figure 13:
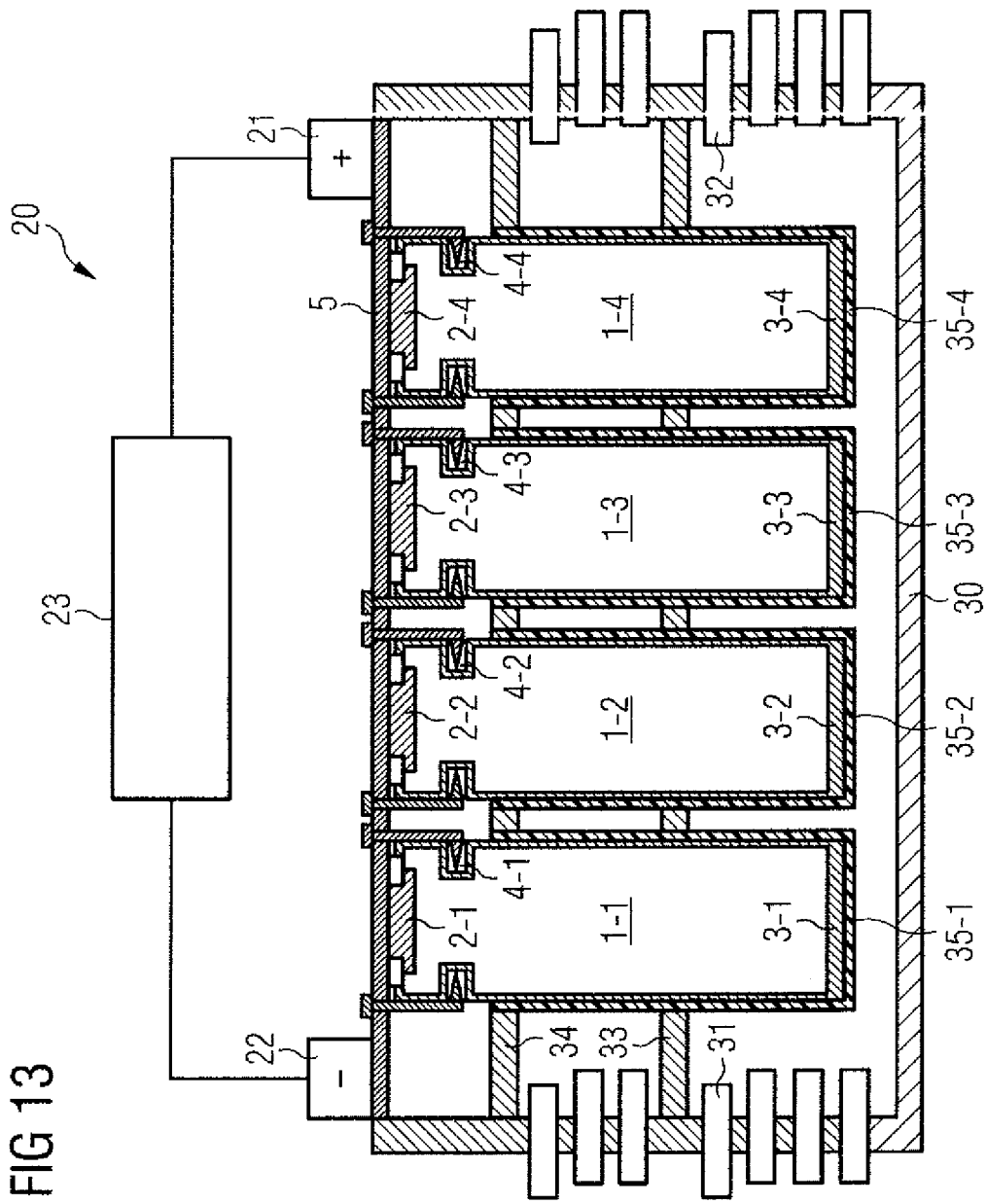
FIG. 13 shows a schematic view of a further exemplified embodiment of an energy storage system in accordance with the invention comprising a plurality of energy storage cells.

FIG. 13 shows a further embodiment variant of the energy storage system 20 in accordance with the invention, in which air is used as the cooling medium. Air slots, namely air inlets 31 and air outlets 32, are located in a housing 30 of the energy storage system 20. The peripheral surfaces 3-1 of the energy storage cells 1-$i$ and their bases have air flowing towards them or circulating around them, so that waste heat can be efficiently dissipated. In the case of the embodiment variant illustrated in FIG. 13, the energy storage system 20 is configured to be open, i.e. air can be supplied from the surrounding area. In the case of the exemplified embodiment illustrated in FIG. 13, the energy storage cells 1-$i$ are enclosed in holders 33, 34, provided for this purpose, which hold the energy storage cells 1-$i$. Sealing is effected with respect to the electrical part of the energy storage system 20 which is located in the upper part of the energy storage system 20. Via the upper part of the energy storage cells 1-$i$, both the positive pole 2-$i$ and the negative pole 3-$i$ are electrically connected by a contacting apparatus in accordance with the invention to the printed circuit board 5 and are electrically connected to the consumer 23. The consumer 23 can be e.g. an electric motor or the like. The energy storage system 20 in accordance with the invention, as illustrated by way of example in FIGS. 12, 13, can be used for multiple purposes, e.g. in an electric vehicle for driving an electric motor. The electric vehicle can be e.g. an electric car or an electric bicycle. The energy storage system 20 in accordance with the invention can be used efficiently for further applications, e.g. for agricultural machinery, lawn mowers or for energy stores in private households. Furthermore, the energy storage system 20 can be used for uninterrupted power supply, e.g. in a hospital. A further possible application of the energy storage system 20 in accordance with the invention is the storage of electrical energy which is generated by a wind turbine or a solar electricity system. The energy storage system 20 in accordance with the invention uses multifunctional printed circuit boards which combine electrical, thermal and static or mechanical functions therein.

The invention claimed is:
1. A contacting apparatus for contacting a cylindrical energy storage cell having at least one electric pole and an outer peripheral surface, the contacting apparatus comprising:
    at least one printed circuit board which is provided for discharging the electrical energy stored in the energy storage cell, the circuit board including an electrically conductive layer which is located on a front side of the at least one printed circuit board facing the energy storage cell;

a releasable mechanical connection configured and operable to press the at least one electric pole with a predetermined contact pressing force against said electrically conductive layer of the at least one printed circuit board; and at least one circumferential groove defined in the peripheral surface of the cylindrical energy storage cell, wherein said releasable mechanical connection includes at least one clip having at least one clip hook configured to be engaged in said at least one circumferential groove.

2. The contacting apparatus as claimed in claim 1, wherein the releasable mechanical connection has a rotary bayonet closure.

3. The contacting apparatus as claimed in claim 1, wherein the cylindrical energy storage cell has an end side including a first electric pole which is pressed by the at least one clip of the releasable mechanical clip connection via a contacting disk against said electrically conductive layer of the printed circuit board.

4. The contacting apparatus as claimed in claim 3, wherein the cylindrical energy storage cell has, on its peripheral surface and on another end side opposite said end side, a second electric pole which is pressed by at least one clip of a further releasable mechanical clip connection via a further contacting disk against an electrically conductive layer of a further printed circuit board.

5. The contacting apparatus as claimed in claim 1, wherein the at least one clip of the releasable mechanical clip connection has a clip neck which extends through a bore in the printed circuit board and has a clip head which engages behind the printed circuit board in order to fix the at least one clip of the releasable mechanical clip connection.

6. The contacting apparatus as claimed in claim 5, wherein a mechanical biasing spring, in the form of a plate spring or a spring ring, having a specific biasing force, is provided between the clip head of the at least one clip of the releasable mechanical clip connection and an edge of the bore of the printed circuit board.

7. The contacting apparatus as claimed in claim 5, wherein the bore of the printed circuit board, through which the clip neck of the at least one clip of the releasable mechanical clip connection extends, is sealed by a seal which prevents the ingress of a fluid from outside towards the energy storage cell.

8. The contacting apparatus as claimed in claim 7, wherein the seal is pressed outwards when an overpressure is produced on the side of the printed circuit board facing the energy storage cell, so that the overpressure produced is decreased.

9. The contacting apparatus as claimed in claim 3, wherein the at least one clip of the releasable mechanical clip connection is electrically conductive, wherein the at least one electrically conductive clip has an electrically conductive clip neck which lies via a contacting disk against the peripheral surface of the cylindrical energy storage cell which has a second electric pole of the energy storage cell, and extends through a bore of the printed circuit board, wherein the at least one electrically conductive clip contacts the second electric pole of the energy storage cell via its electrically conductive clip neck and its electrically conductive clip head and at least one further contacting disk with an electrically conductive layer which is located on a rear side of the printed circuit board facing away from the energy storage cell.

10. The contacting apparatus as claimed in claim 9, wherein a mechanical biasing spring, in the form of a plate spring or a spring ring, having a specific biasing force, is provided between the electrically conductive clip head of the at least one electrically conductive clip and an edge of the bore of the printed circuit board.

11. The contacting apparatus as claimed in claim 3, wherein the peripheral surface of the cylindrical energy storage cell which has the second electric pole of the energy storage cell is pressed by the releasable mechanical connection via a contacting disk against a further electrically conductive layer which is located on the front side of the printed circuit board facing the energy storage cell.

12. The contacting apparatus as claimed in claim 1, wherein the releasable mechanical clip connection has at least one SMD-clip which is soldered to the electrically conductive layer located on the front side of the printed circuit board facing the energy storage cell, or is integrally formed on the printed circuit board.

13. The contacting apparatus as claimed in claim 12, wherein the energy storage cell is a cylindrical energy storage cell which has on its peripheral surface at least one circumferential groove, into which at least one clip hook of the at least one SMD-clip of the releasable mechanical connection latches.

14. The contacting apparatus as claimed in 3 wherein the contacting disks consist of an elastic polymer material which is electrically and thermally conductive.

15. An energy storage system for storing electrical energy in a plurality of energy storage cells, wherein the energy storage cells are each mounted by means of a contacting apparatus as claimed in claim 1 on a printed circuit board of the energy storage system for discharging the electrical energy stored in the respective energy storage cell.

16. The energy storage system as claimed in claim 15, wherein the energy storage cells mounted on the printed circuit board are immersed into a cooling medium container filled with a cooling medium in order to be cooled or have an air flow circulated around them in order to be cooled.

17. An electric vehicle comprising an energy storage system as claimed in claim 15.

18. The contacting apparatus as claimed in 9 wherein the contacting disks consist of an elastic polymer material which is electrically and thermally conductive.

* * * * *